No. 770,640. PATENTED SEPT. 20, 1904.
H. H. HOLMES.
TRAP.
APPLICATION FILED NOV. 21, 1903.
NO MODEL.

Witnesses

Inventor
Henry H. Holmes
By Victor J. Evans
Attorney

No. 770,640.

Patented September 20, 1904.

UNITED STATES PATENT OFFICE.

HENRY HORTON HOLMES, OF COUNCIL BLUFFS, IOWA.

TRAP.

SPECIFICATION forming part of Letters Patent No. 770,640, dated September 20, 1904.

Application filed November 21, 1903. Serial No. 182,146. (No model.)

*To all whom it may concern:*

Be it known that I, HENRY HORTON HOLMES, a citizen of the United States, residing at Council Bluffs, in the county of Pottawattamie and State of Iowa, have invented new and useful Improvements in Traps, of which the following is a specification.

My invention relates to new and useful improvements in gopher-traps; and its object is to provide a simple, durable, and inexpensive device of this character which is provided with bait-protecting means, whereby removal of the bait without the resultant releasing of the trap is prevented.

A further object is to provide means for preventing the accumulation under the trap of dirt or other material which would tend to release the trap when the same becomes accidentally depressed.

With the above and other objects in view the invention consists in the novel construction and combination of parts hereinafter more fully described and claimed, and illustrated in the accompanying drawings, showing the preferred form of my invention, and in which—

Figure 1:
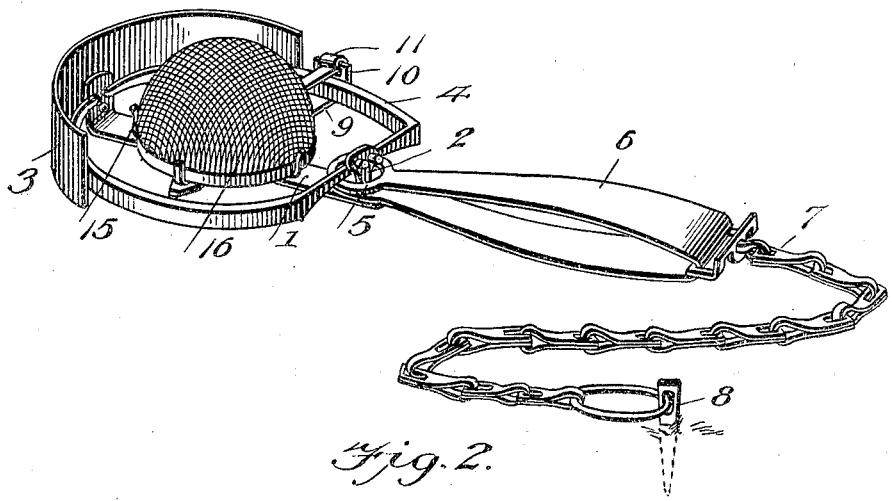
Figure 2:
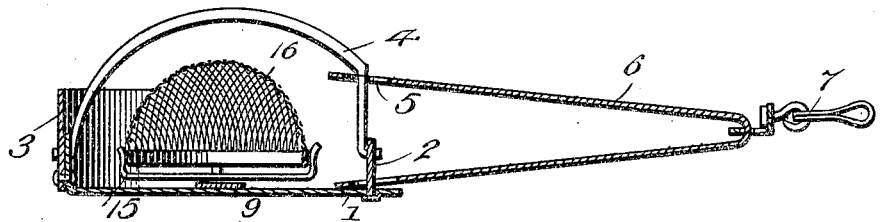
Figure 3:
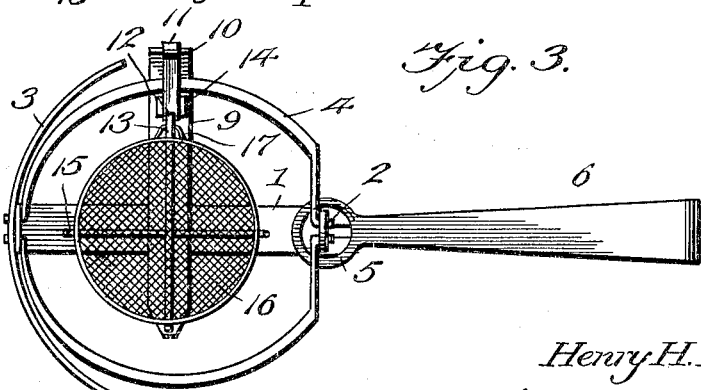

Figure 1 is a perspective view of the trap set. Fig. 2 is a central vertical longitudinal section therethrough, showing the trap after it has been sprung; and Fig. 3 is a plan view of the trap when set.

Referring to the figures by numerals of reference, 1 is a base-plate having an ear 2, extending upward therefrom at one end, while its other end is connected to a bow-shaped guard, which partly incloses the trap. Bow-shaped jaws 4 are pivoted at their ends to the center of the guard and to the ear 2, respectively, and the inner ends of these jaws project through an eye 5, formed in one end of a bow-spring 6. This bow-spring is secured to the ear 2 in any suitable manner, and a chain 7 is connected to the spring and is provided at its other end with a stake 8 or other device for securing the trap to a fixed object.

An arm 9 extends laterally from the base-plate 1 and has an upwardly-turned end 10, in which is pivoted a dog 11. This dog is adapted to engage a lug 12, formed on the upper edge of a lever 13, which is fulcrumed between ears 14, secured on the arm 9. This lever has oppositely-extending arms 15, which serve to assist it in supporting a cap 16, formed of wire-netting.

To use the trap, bait is first placed upon the lever 13 and its arms 15 and is covered by the cap 16, which is fastened to the lever in any suitable manner, as by means of a loop 17, engaging said lever. The bow-spring 6 is then compressed, so as to permit the jaws 4 to be swung laterally in opposite directions. One of these jaws is placed in position under the dog 11, and said dog engages the lug 12 on lever 13 and is held in position thereby. The trap is then placed at a suitable point, and when the cap is depressed the lug 12 will be promptly disengaged from the dog 11 and spring 6 will throw the jaws together. By providing a guard-plate 3 at one end of the trap dirt, &c., is prevented from accumulating under said trap when the same is slid along the ground. It will be seen that the trap is very simple, durable, and inexpensive in construction and effective in operation. The cap 16 thoroughly covers the bait and prevents it from being removed by an animal.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

In a device of the character described, the combination with a base-plate having a guard extending upward from one end thereof, and an ear adjacent the other end of the plate; of a bow-spring having eyes at the ends thereof, said eyes being adapted to receive the ear, oppositely-arranged bowed jaws pivotally mounted upon the inner face of the guard and upon the ear, said jaws being adapted to
5 be inclosed by one of the eyes of the spring, a laterally-extending arm upon the base, a dog pivoted thereon and adapted to overlap one of the jaws, a lever pivotally mounted upon the base and adapted to engage the dog, and a bait-cap upon the lever.

In testimony whereof I affix my signature in presence of two witnesses.

HENRY HORTON HOLMES.

Witnesses:
 E. F. ANDERSON,
 STEPHEN W. BESLEY.